United States Patent
Kundermann

(10) Patent No.: US 6,343,679 B1
(45) Date of Patent: Feb. 5, 2002

(54) HYDRODYNAMIC CLUTCH DEVICE, IN PARTICULAR HYDRODYNAMIC TORQUE CONVERTER

(75) Inventor: Wolfgang Kundermann, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/545,527

(22) Filed: Apr. 7, 2000

(30) Foreign Application Priority Data

Apr. 7, 1999 (DE) .......................................... 199 15 527

(51) Int. Cl.[7] .............................................. F16D 45/02
(52) U.S. Cl. ...................... 192/3.3; 192/85 AA; 192/86
(58) Field of Search ................................ 192/3.29, 3.3, 192/85 AA, 86

(56) References Cited

U.S. PATENT DOCUMENTS

| | | | |
|---|---|---|---|
| 4,143,561 A | | 3/1979 | Melhorn |
| 4,199,047 A | * | 4/1980 | Ling .......................... 192/3.3 |
| 4,529,070 A | * | 7/1985 | Kobayashi ............... 192/3.3 X |
| 5,598,906 A | * | 2/1997 | Ishiguro et al. .............. 192/3.3 |
| 5,762,172 A | * | 6/1998 | Tsukamoto et al. ........ 192/3.29 |
| 5,964,329 A | * | 10/1999 | Kawaguchi et al. ......... 192/3.3 |
| 6,012,558 A | * | 1/2000 | Kundermann .............. 192/3.29 |

FOREIGN PATENT DOCUMENTS

FR   23 41 791   9/1977

* cited by examiner

Primary Examiner—Rodney H. Bonck
(74) Attorney, Agent, or Firm—Cohen, Pontani, Lieberman & Pavane

(57) ABSTRACT

A hydrodynamic clutch device, especially a hydrodynamic torque converter. The clutch device has a housing in which is formed a fluid chamber. The fluid chamber is divided into two fluid chamber areas by a piston of a lockup clutch, which piston is fixed with respect to relative rotation at the housing and is movable axially with respect to a housing axis, namely, into a first fluid chamber containing a turbine wheel and impeller wheel and possibly a stator wheel, and a second fluid chamber. A fluid pressure which is higher than a fluid pressure in the first fluid chamber area can be applied to the second fluid chamber area in order to bring the lockup clutch into a lockup state. In a non-lockup state of the lockup clutch, the two fluid chamber areas are in a fluid flow connection and fluid can be supplied to the fluid chamber via the first fluid chamber area. When fluid is supplied to the first fluid chamber area fluid can be discharged from the fluid chamber exclusively via the second fluid chamber area in the non-lockup state.

5 Claims, 1 Drawing Sheet

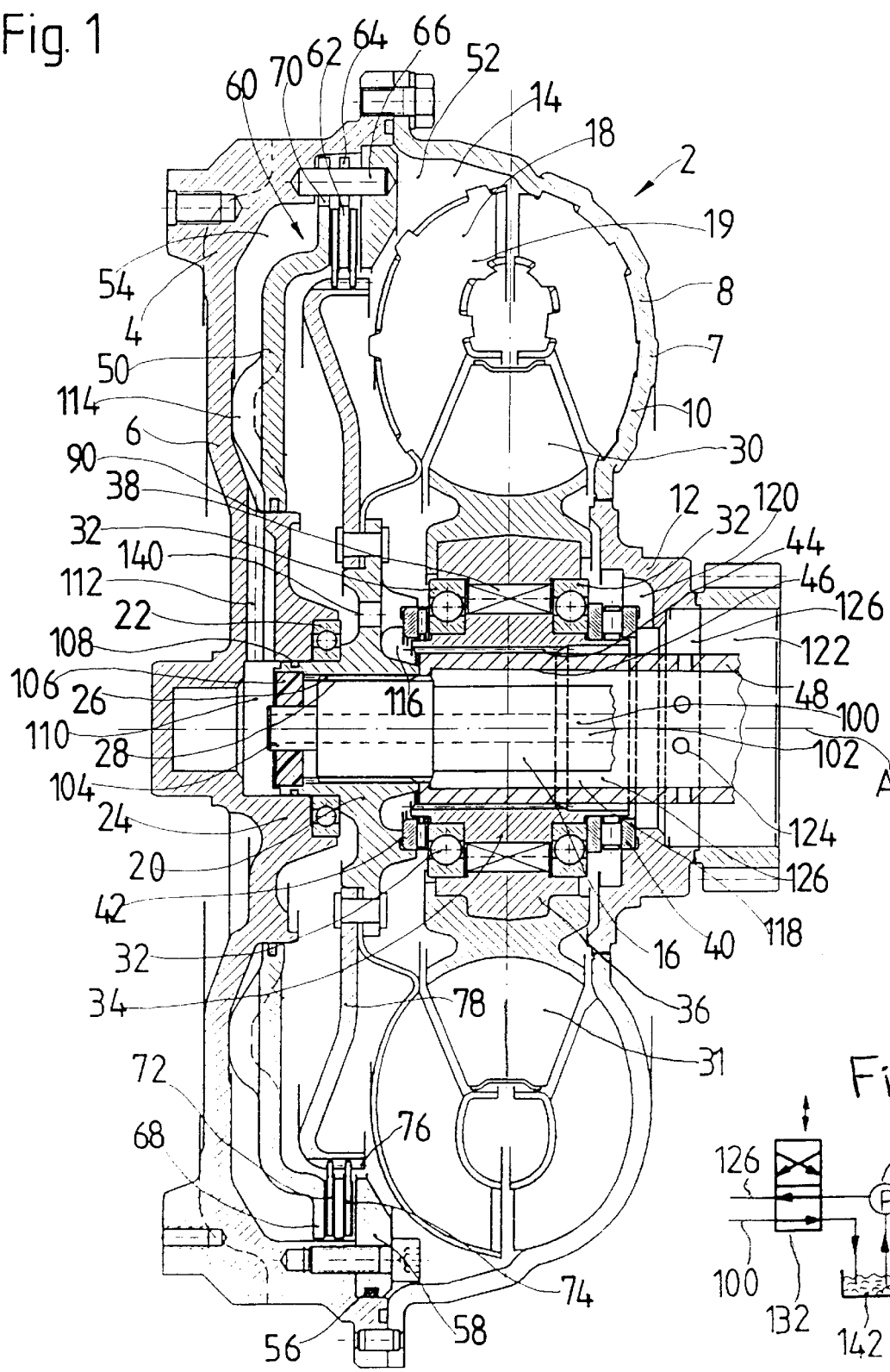

HYDRODYNAMIC CLUTCH DEVICE, IN PARTICULAR HYDRODYNAMIC TORQUE CONVERTER

BACKGROUND OF THE INVENTION

1. Field of the Invention

The present invention is directed to a hydrodynamic clutch device, especially a hydrodynamic torque converter, with a housing containing a fluid chamber. The fluid chamber is divided into a first fluid chamber containing a turbine wheel and impeller wheel and a second fluid chamber by means of a piston of a lockup clutch, which piston is movable axially with respect to a housing axis.

2. Discussion of the Prior Art

A hydrodynamic torque converter of the type mentioned above is known, for example, from U.S. Pat. No. 4,143,561. In the known torque converter, the piston is rotatable relative to the housing and is connected via a torsional vibration damping arrangement with a hub of the turbine wheel so as to transmit torque.

Another hydrodynamic torque converter of the type mentioned above is known from French reference FR 2 341 791. As far as can be gathered from FIG. 1 of this laid open application, the piston is arranged at the housing so as to be fixed with respect to rotation relative to it and engages by its inner circumference in a sealing engagement in the outer circumference of a housing hub by means of a radial inner sealing ring and engages in a sealing engagement by its outer circumference in an inner circumference of a housing wall by means of a radial outer sealing ring, so that the first fluid chamber area and the second fluid chamber area are sealed relative to one another regardless of the state (lockup state, or non-lockup state) of the lockup clutch. A higher fluid pressure can be applied to the second fluid chamber area via a bore hole in a driven shaft of the converter relative to a fluid pressure in the first fluid chamber area in order to put the lockup clutch into the lockup state, that is, to engage the lockup clutch. The first fluid chamber area is connected to a fluid pump (oil pump) via an annular fluid passage which is formed between a supporting shaft of a stator wheel of the converter, which supporting shaft is foxed as a hollow shaft, and a housing hub. Since the second fluid chamber area is sealed relative to the first fluid chamber area, the first fluid chamber area must be additionally connected to another fluid passage in order to provide a fluid circuit through the first fluid chamber area, which is a compulsory requirement for discharging friction heat from the first fluid chamber area. It is not clear from the Figure, which may not be entirely correct in some details, whether or not the additional fluid passage to which the first fluid chamber area must be connected runs between the outer circumference of the driven shaft and the inner circumference of the supporting shaft as is generally the case in other known torque converters.

SUMMARY OF THE INVENTION

It is an object of the present invention to provide a hydrodynamic clutch device which has an economically producible piston and which can be controlled in a simple manner and economically with respect to the construction of an associated fluid supply and/or control valve arrangement in relation to the engagement and disengagement of the lockup clutch and the exchange of fluid contained in the first fluid chamber area for the purpose of discharging heat.

This object is met through a hydrodynamic clutch device, especially a hydrodynamic torque converter of the type mentioned above, in which, according to the invention, the piston is connected to the housing so as to be fixed with respect to rotation relative to it. A fluid pressure which is higher than a fluid pressure in the first fluid chamber area can be applied to the second fluid chamber area in order to bring the lockup clutch into a lockup state. In a non-lockup state of the lockup clutch, the two fluid chamber areas are in a fluid flow connection and fluid can be supplied to the fluid chamber via the first fluid chamber area. When fluid is supplied to the first fluid chamber area fluid can be discharged from the fluid chamber exclusively via the second fluid chamber area.

According to the above, a two-line system is sufficient for controlling the clutch device, wherein a fluid source, especially a pressure fluid source, is connected to the two-line system, e.g., via a simple switching valve, either to the first fluid chamber area or to the second fluid chamber area and an associated fluid receptacle (for example, a reservoir, suction connection of a fluid pump, or the like) is connected to the other respective fluid chamber area.

When the fluid source is connected to the first fluid chamber area, the lockup clutch is put into the non-lockup state by a corresponding axial movement of the piston or is held in this non-lockup state and fresh (especially cooled) fluid flows out of the fluid source into the first fluid chamber area, from which fluid which is correspondingly "used" (heated by friction) flows into the second fluid chamber area and then back into the fluid receptacle, so that there is established through the fluid chamber a fluid circuit through which friction heat can be reliably transported out of the fluid chamber. A closed fluid circuit preferably exists via a fluid cooler, so that the fluid withdrawn from the fluid chamber, more precisely, from the second fluid chamber area, is supplied again to the first fluid chamber area after cooling.

However, when the fluid source is connected to the second fluid chamber area by corresponding switching of the switching valve, the piston is moved axially in the direction of an engagement position by the fluid flowing into the second fluid chamber area and the lockup clutch is accordingly moved into the lockup state. Since, in the lockup state, the turbine wheel and impeller wheel and the fluid contained in the first fluid chamber area essentially rotate jointly about the housing axis, only a little friction is generated in the housing in this state, so that there is no need for an exchange of fluid for cooling. Consequently, the fluid flow connection can be interrupted in the lockup state. An interruption in the fluid flow connection in the lockup state has the advantage that correspondingly higher pressures can be built up in the second fluid chamber area and the lockup clutch can consequently transmit high torques. For this reason, it is preferred that the two fluid chamber areas are substantially sealed relative to one another in the lockup state.

In this regard, it is suggested that the fluid flow connection existing in the non-lockup state between the two fluid chamber areas leads through friction surface arrangements of the lockup clutch which are associated with one another and which are in a frictional and sealing engagement in the lockup state and consequently automatically interrupt the fluid flow connection.

A substantial advantage of the described construction is that a sealing ring arrangement provided at the piston on the radial outside and a respective sealing seat arrangement of the piston are not required, since the sealing is not effected in the lockup state by the friction surface arrangements. Obviously, in the non-lockup state, no sealing is required because in this state of the lockup clutch a fluid flow connection exists between both fluid chamber areas according to the invention.

The lockup clutch can comprise a plate arrangement and an abutment arrangement. This plate and abutment arrangement can have at least one driven-side plate in a torque-transmitting connection with a drive shaft and an abutment which is arranged at the housing so as to be fixed with respect to relative rotation. Further, there is provided at least one housing-side plate which is fixed with respect to relative rotation at the housing. In the event that there is only one driven-side plate, the arrangement is preferably carried out in such a way that the plate having a friction surface on both sides engages between a friction surface of the piston and a friction surface of the abutment. When a housing-side plate having a friction surface on both sides is provided, a first driven-side plate engages between the friction surface of the piston and the one friction surface of the housing-side plate and a second driven-side plate engages between the other friction surface of the housing-side plate and the friction surface of the abutment. For a greater quantity of plates, construction is carried out in a corresponding manner, wherein the quantity of driven-side plates exceeds the quantity of housing-side plates by one, so that every driven-side plate engages between two housing-side friction surfaces and consequently a housing-side friction surface and a driven-side friction surface lie opposite one another in pairs.

For fluid control of the clutch device, the first fluid chamber area is connected to an annular fluid passage between a housing hub and a supporting shaft of a stator wheel of the clutch device and/or is connected to an annular fluid passage between a/the driven shaft and the supporting shaft. When no supporting shaft is provided, for example, in the case of a hydrodynamic clutch device without a stator wheel, only an annular fluid passage which is constructed between the driven shaft and the housing hub is provided as a rule.

With respect to the second fluid chamber area, it is suggested that this second fluid chamber area is connected to a fluid passage formed in a/the driven shaft.

The fluid is generally a hydraulic liquid, especially hydraulic oil.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

FIG. 1 shows a cross-section through a hydrodynamic torque converter pursuant to the present invention; and FIG. 1a is a schematic diagram of a switching valve.

DETAILED DESCRIPTION OF THE PREFERRED EMBODIMENTS

FIG. 1 shows a sectional view of a hydrodynamic torque converter 2 which has a converter housing 4 comprising a drive-side housing shell 6 and a driven-side housing shell 10 which is constructed as an impeller blade arrangement 7. The driven-side housing shell 10 (impeller blade arrangement 7) is tightly arranged at a driven-side housing hub 12, for example, by welding, and forms an impeller wheel 8 with this housing hub 12.

The converter housing 4 defines a fluid chamber 14 in which a turbine wheel 18 is arranged so as to be rotatable. A turbine blade arrangement 19 of the turbine wheel 18 is arranged at a turbine hub 20 of the turbine wheel 18 and is rotatably supported by means of a pivot bearing 22 at a drive-side housing hub 24. The turbine hub 20 has an inner toothing 26 which engages with an outer toothing 28 at a driven shaft 16 extending through the driven-side housing hub 12 and is consequently connected with the driven shaft 16 so as to be fixed with respect to rotation relative to it.

A stator wheel 30, whose stator blade arrangement 31 is held at a stator wheel hub 34 via a pivot bearing arrangement 32, is arranged between the impeller wheel 8 and the turbine wheel 18. A freewheel 38 (especially a rolling freewheel) acts between the stator wheel hub 34 and an annular part 36 of the stator wheel 30 and allows a relative rotation of the stator blade arrangement 31 and the annular part 36 on the one hand and the stator wheel hub 34 on the other hand in one rotating direction and blocks a relative movement between the above-mentioned components in the opposite rotating direction. The stator wheel hub 34 is supported at the turbine hub 20 on the driven side via an axial bearing 40 and on the driving side via an axial bearing 42 and has an inner toothing 44 which meshes with an outer toothing 46 of a supporting shaft 48 constructed as a hollow shaft and is consequently connected with the supporting shaft 48 so as to be fixed with respect to rotation relative to it. The supporting shaft 48 extends in an annular intermediate space between the driven shaft 16 and the driven-side housing hub 12.

A piston 50, which is held at the drive-side housing shell 6 so as to be fixed with respect to rotation relative to it and which is guided so as to be axially displaceable, divides the fluid chamber 14 into a first fluid chamber area 52, which contains the turbine wheel 18, the stator wheel 30 and the impeller wheel 8, and a second fluid chamber area 54 which is defined by the drive-side housing shell 6 and the piston 50. Together with an abutment ring 58, which is arranged at the drive-side housing shell 6 so as to be fixed with respect to rotation relative to the latter and so as to be sealed by means of a sealing ring 56, the piston 50 belongs to a lockup clutch 60 which will be described more fully in the following. It should be noted in addition with respect to the abutment ring 58 that this abutment ring 58 is screwed to the drive-side housing shell 6 in the embodiment shown here; however, it could also be welded to the drive-side housing shell 6, for example, by laser welding, so that the sealing ring 56 can be dispensed with if desired.

The lockup clutch 60 further has a plate 62 which is supported at the drive-side housing shell 6 so as to be fixed with respect to rotation relative to the latter. In order to secure the plate 62 against rotation relative to the housing 4, the plate 62 has a toothing 64 which is located on the radial outside and which engages in a positive engagement with pins 66 held at the drive-side housing shell 6 and at the abutment ring 58. In a corresponding manner, the piston 50 has a toothing 70 at a flange portion 68 located on the radial outside, which toothing 70 engages in a positive engagement with the pin 66 and accordingly secures the piston 50 against rotation relative to the converter housing 4.

A driven-side plate 72 and 74, respectively, engages between the flange portion 68 of the piston 50 and the (housing-side or drive-side) plate 62 and between the plate 62 and the abutment ring 58 and has a toothing which is located on the radial inside and is in a positive engagement with an associated outer toothing 76 of a plate carrier 78 and accordingly prevents a rotation relative to the plate carrier 78. The plates 62, 72 and 74 and the piston 50 are guided at the pin 66 and the plate carrier 78 so as to be displaceable in the axial direction (converter axis A). The plate carrier 78 is arranged at the turbine hub 20 so as to be fixed with respect to rotation relative to it, namely, is riveted to the turbine hub 20 of the turbine wheel 18 together with the turbine blade arrangement 19.

The flange portion 68, the tree plates 62, 72 and 74 and the abutment ring 58 each have friction surfaces which are located opposite one another in pairs, wherein a housing-side, and therefore driving-side, friction surface is located opposite to a driven-side friction surface in each pair of friction surfaces. In order to produce a lockup state of the lockup clutch 60, the friction surfaces must be brought into a frictional engagement with one another. As will be described more fully, this is achieved by means of corresponding actuation of the piston 50, namely, by means of axial displacement of the piston 50 in the direction of the wheel arrangement comprising the impeller wheel 8, the turbine wheel 18 and the stator wheel 30. In the lockup state, there is a direct, frictionally engaging torque transmission connection between the drive side (housing 4) and the driven side (driven shaft 16) of the converter, wherein a torsional damper arrangement can be integrated in addition in the torque transmission path in contrast to the view in FIG. 1. The torsional damper arrangement could be integrated, for example, in a plate carrier arrangement which carries out the function of the plate carrier 78.

In the lockup state, the two fluid chamber areas 52 and 54 are sealed relative to one another, specifically, by the sealing ring 56 acting between the drive-side housing shell 6 and the abutment ring 58, a sealing ring 90 acting between the piston 50 and the drive-side housing hub 24, and by means of the frictionally engaging friction surfaces of the flange portion 68, the plates 62, 72 and 47 and the abutment ring 58. For this purpose, the friction surfaces are constructed with a corresponding surface and a corresponding material, for example, paper, so that the friction surfaces are in a sealing engagement in the lockup state of the lockup clutch 60.

In order to move the lockup clutch 60 into a non-lockup state, the piston 50 must be displaced in the opposite axial direction toward the drive-side housing shell 6, so that the frictional engagement and sealing engagement between the friction surfaces is canceled and a fluid through-flow connection is accordingly produced between the first fluid chamber area 52 and the second fluid chamber area 54 between the disengaged friction surfaces.

The fluid chamber 14 can be connected to, or is connected to, an associated fluid supply via two fluid channel arrangements. A first fluid channel 100 is formed by an axial bore hole in the driven shalt 16. The first fluid channel 100 is connected to the second fluid chamber area 54 via a space 110 which is formed between the end of the driven shaft 16 received in the turbine hub 20 and the drive-side housing hub 24 and which is sealed by a sealing ring 106 acting between a shoulder 104 of the driven shaft 16 and the hub 20 and by a sealing ring 108 acting between the turbine wheel 20 and the drive-side housing hub 24, and via a plurality of fluid channels 112 extending in the radial direction. The piston 50 is constructed with projections 114 which enable the piston 50 to contact the drive-side housing shell 6 while nevertheless ensuring a passage of fluid between the drive-side housing shell 6 and the piston 50.

The first fluid chamber area 52 is connected to an annular fluid passage 118 between the outer circumference of the driven shaft 16 and the inner circumference of the tubular supporting shaft 48 via a plurality of essentially radially extending fluid channels 116 between the turbine hub 20 and the stator wheel hub 34 on the one hand and is connected on the other hand to an annular fluid passage 122 between the outer circumference of the supporting shaft 48 and the inner circumference of the driven-side housing hub 12 via a plurality of fluid channels 120 between the stator wheel hub 34 and the driven-side housing hub 12. The two annular fluid passages 118 and 122 communicate so as to allow a flow of fluid via fluid passages 124 in the tubular supporting shaft 48, that is, they are connected in parallel. The two fluid passages 118 and 122 can therefore be considered jointly as a second fluid channel 126 which, together with the first fluid channel 100 through the driven shaft 16, serves to control the piston 50 with respect to engagement and disengagement of the lockup clutch 60 and to supply fluid to the fluid chamber 14 and to discharge fluid from the latter for the purpose of removing heat from the torque converter.

Since only two fluid channels are provided with respect to function, namely, the first fluid channel 100 formed in the driven shaft and the second fluid channel 126 formed by the two parallel-connected fluid passages 118 and 124, the controlling of the converter can be carried out in a particularly simple manner by means of a two-way switching valve as is indicated in the schematic diagram in FIG. 1a. When the lockup clutch 60 is to be disengaged, that is, not in a lockup state, fluid (hydraulic oil) in the first fluid chamber area 52 is supplied to the converter by a fluid pump, in this case, a hydraulic oil pump 130, via the switching valve 132, the second fluid channel 126 (fluid passages 118 and 122) and the fluid channels 116 and 120. Insofar as the lockup clutch 60 was still engaged, the piston 50 is displaced in the direction of the drive-side housing shell 6 until the projections 114 of the piston 50 contact the housing due to the rising pressure in the first fluid chamber area 52 corresponding to the supply of fluid in the first fluid chamber area 52. In this connection, it is noted that fluid passages 140 are provided in the turbine hub 20 and ensure that the same fluid pressure prevails in the first fluid chamber area 52 on both sides of the plate carrier 78. Corresponding passages can also be provided in the plate carrier 78.

As was already mentioned, in the disengaged state of the lockup clutch 60 there is a fluid through-flow connection between the two fluid chamber areas 52 and 54, so that fluid flows from the first fluid chamber area 52 into the second fluid chamber area 54 corresponding to the fluid supply in the first fluid chamber area 52 via the second fluid channel 126 and flows from the second fluid chamber area 54 via the fluid channels 112, the space 110, the first fluid channel 100 and the valve 132 into a fluid reservoir, especially a hydraulic oil reservoir 142. The pump 130 is connected to the fluid reservoir 142 and sucks fluid out of the reservoir 142 and supplies it to the first fluid chamber area 52 again on the described path. Accordingly, there is a fluid circuit in which a fluid cooler, not shown, in particular a hydraulic oil cooler, is provided so that cooled fluid is fed to the first fluid chamber area 52 and an overheating of the converter due to friction heat in the converter is reliably prevented.

If the lockup clutch is to be engaged, that is, occupy a lockup state, it is necessary only to switch the valve 132, so that the fluid is supplied by the pump 130 via the first fluid channel 100 to the second fluid chamber area 54 and, correspondingly, a fluid pressure flow connection is produced from the first fluid chamber area 52 via the second fluid channel 126 to the reservoir 142. Through the supply of fluid to the second fluid chamber area 54 via the fluid channels 112, the fluid pressure in the second fluid chamber area 54 rises and the piston 50 is consequently displaced in the direction of the converter center, that is, in the direction of the wheel arrangement (impeller wheel 8, stator wheel 30 and turbine wheel 18) until the frictional and sealing engagement between the friction surfaces at the flange portion 68, the plates 62, 72 and 74 and the abutment ring 58 is produced and the fluid through-flow connection between the two fluid chamber areas 52 and 54 is consequently interrupted. Since the impeller wheel 8 and the turbine wheel 18 are rigidly coupled in the lockup state, no substantial friction heat is generated in the first fluid chamber area—in contrast to the non-lockup state—so that it is no longer necessary to discharge fluid from the first fluid chamber area and to resupply cooled fluid to the first fluid chamber area 52. For this reason, no fluid connection is provided in this embodiment between the two fluid chamber areas 52 and 54 in the lockup state, so that the fluid circuit is interrupted by the two fluid chamber areas. However, a certain residual flow could easily be provided by the two fluid chamber areas via corresponding through-openings, wherein these through-flow openings should be dimensioned in such a way that the fluid pressure producing the frictional engagement between the friction surfaces in the second fluid chamber area should not drop substantially.

In connection with the described control of the converter via two hydraulic channels, the described construction of the converter with the piston which is movable in the direction of the converter center for producing the lockup state has the advantage that the "fresh" or cooled fluid is supplied from the radial inside to the first fluid chamber area, from which the friction occurring therein in the non-lockup state is to be discharged, and consequently, under the influence of the centrifugal forces acting during converter operation, flows through the entire radial area of the first fluid chamber area 52 and is uniformly distributed in the first fluid chamber area 52. The controllability of the converter via only two hydraulic channels, one of which serves as a feed line while the other serves as a discharge line, makes it possible that a pump and control valve arrangement can be constructed in a simple manner in an associated transmission or the like. Since a sealing of the two fluid chamber areas in the non-lockup state is dispensed with and the friction surfaces seal the two fluid chamber areas relative to one another in the lockup state, a costly seal arrangement acting on the piston on the radial outside with a corresponding seal fit can be omitted, resulting in substantial cost advantages.

In summary, the invention is directed to a hydrodynamic clutch device, especially a hydrodynamic torque converter. The clutch device has a housing in which a fluid chamber is formed. The fluid chamber is divided by a piston which is fixed with respect to relative rotation at a housing and axially movable with respect to a housing axis into two fluid chamber areas, namely, a first fluid chamber area containing a turbine wheel and an impeller wheel and possibly a stator wheel and a second fluid chamber area. In order to put the lockup clutch into a lockup state, a fluid pressure which is higher than a fluid pressure in the first fluid chamber area can be applied to the second fluid chamber area. In a non-lockup state of the lockup clutch, the two fluid chamber areas are in a fluid flow connection and fluid can be supplied to the fluid chamber via the first fluid chamber area. Fluid can be discharged exclusively via the second fluid chamber area when fluid is supplied to the first fluid chamber area from the fluid chamber in the non-lockup state.

The invention is not limited by the embodiments described above which are presented as examples only but can be modified in various ways within the scope of protection defined by the appended patent claims.

I claim:

1. A hydrodynamic clutch device, comprising: a housing defining a fluid chamber and having a hub; a lockup clutch having a piston arranged in the housing so as to divide the fluid chamber into a first fluid chamber area and a second fluid chamber area, the piston being movable axially with respect to a housing axis; a turbine wheel arranged in the first fluid chamber area; an impeller wheel arranged in the first fluid chamber area; a fluid flow connection between the first and second fluid chamber areas in a non-lockup state of the lockup clutch, so that fluid can be supplied to the fluid chamber via the first fluid chamber area, and when fluid is supplied to the first fluid chamber area fluid can be discharged from the fluid chamber exclusively via the second fluid chamber area, a fluid pressure which is higher than a fluid pressure in the first fluid chamber area being applicable to the second fluid chamber area in order to bring the lockup clutch into a lockup state; a stator wheel having a support shaft; and a driven shaft in a torque-transmitting connection with the lockup clutch, a first annular fluid passage being arranged between the housing hub and the support shaft, a second annular fluid passage being arranged between the driven shaft and one of the support shaft and the housing hub, the first fluid chamber area being connected to both annular fluid passages.

2. A hydrodynamic clutch device according to claim 1, wherein the fluid flow connection is configured so as to be interrupted in the lockup state of the lockup clutch.

3. A hydrodynamic clutch device according to claim 2, wherein the fluid chamber areas are sealed relative to one another in the lockup state.

4. A hydrodynamic clutch device according to claim 1, wherein the lockup clutch comprises a plate and an abutment arrangement with at least one driven-side plate in a torque-transmitting connection with a driven shaft, and an abutment which is arranged at the housing so as to be fixed with respect to relative rotation, the lockup clutch further comprising at least one housing-side plate fixed to the housing with respect to relative rotation.

5. A hydrodynamic clutch device according to claim 3, wherein the driven shaft has a fluid channel connected to the second fluid chamber area.

* * * * *